R. H. LUCAS,
Assignor to F. M. McMillan & H. C. Johnson.
REFRIGERATING BY MEANS OF AMMONIA.
No. 10,161. Reissued July 18, 1882.
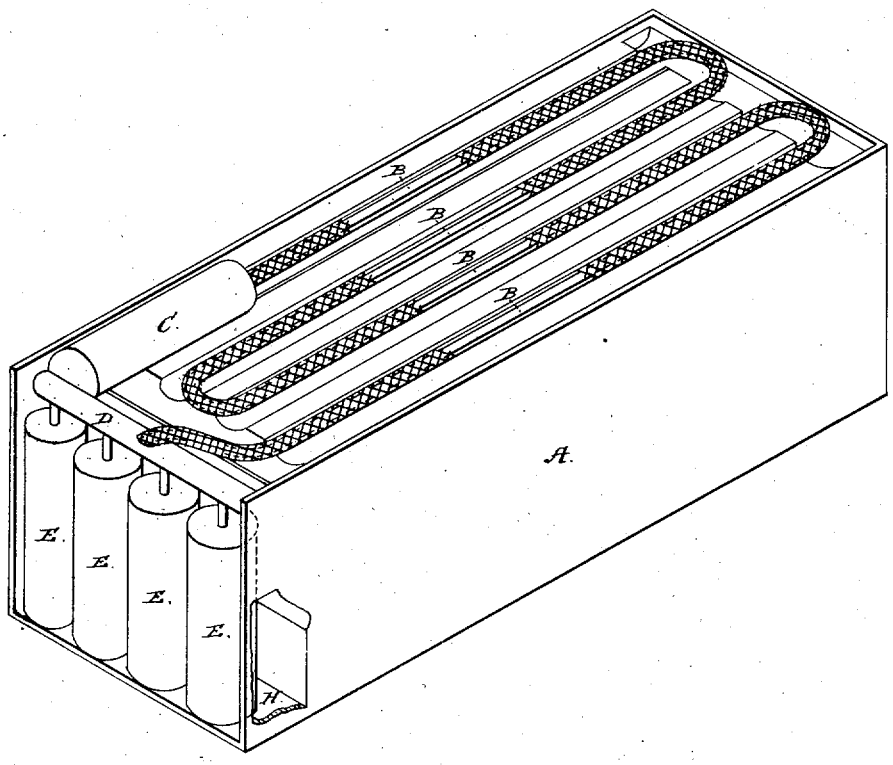
Attest;
H. W. Howard,
Walter S. Dodge.
Inventor;
Robert H. Lucas,
by Dodger & Co.
Attys.

UNITED STATES PATENT OFFICE.

ROBERT H. LUCAS, OF SAN FRANCISCO, CAL., ASSIGNOR TO FRANCIS M. McMILLAN AND HENRY C. JOHNSON, OF WASHINGTON, D. C.

REFRIGERATING BY MEANS OF AMMONIA.

SPECIFICATION forming part of Reissued Letters Patent No. 10,161, dated July 18, 1882.

Original No. 193,375, dated July 24, 1877. Application for reissue filed June 21, 1882.

*To all whom it may concern:*

Be it known that I, ROBERT H. LUCAS, a citizen of the United States, residing in the city and county of San Francisco, and State of California, have invented certain new and useful Improvements in Refrigerating, of which the following is a specification, reference being had therein to the accompanying drawing.

The first part of my invention consists in storing anhydrous ammonia in portable vessels, so that it can be readily transported and employed for purposes of refrigeration by allowing it to change its form from a liquid to a gaseous condition; and the second part of my invention consists in a combination and arrangement by which I am able to attach these portable ammonia-containing vessels to or detach them from a series of pipes or tubes which connect at the opposite end of the series with one or more detachable water-tanks, so that the ammonia, after being converted into a gas, will pass through the pipes or tubes and enter into solution with the water, thus forming the aqua-ammonia of commerce, from which condition it can be converted back again into anhydrous ammonia.

The capacity of anhydrous ammonia of being condensable by pressure into a liquid, from which condition it will readily expand or evaporate when liberated, so as to produce a freezing temperature, and also the absorbing capacity of water for taking up this gas into solution, have long been known, and because ammonia possesses these qualities it has been extensively employed in the manufacture of ice.

The chief object of my invention is to store this condensed anhydrous ammonia in closed vessels, so that a number of the vessels can be carried upon or along with a traveling or portable refrigerator, and thus provide a constant supply of material for producing a refrigeratory action, and also provide an arrangement for saving and restoring it again to its anhydrous condition. The great affinity of anhydrous ammonia for water enables me by my arrangement of pipes and vessels to secure a steady current of gas through the pipes without the use of pumps or other machinery.

Referring to the accompanying drawing, the figure is a perspective view of my apparatus.

Let A represent a car or other structure in which it is desired to preserve any article or substance. In the top part of this car or structure I place a series of connected pipes or tubes, B B B, so that they all communicate with each other. To one end of this connected series of pipes I attach the vessel C, in which anhydrous ammonia has been previously condensed into a liquid form by pressure, and the opposite ends of the connected series of tubes I connect with a tube, D. Below this tube I place one or more closed tanks of water, E, which I connect with the tube. I then open communication between the vessel C and pipes or tubes, so that the contained liquid ammonia can evaporate or expand into the tube. The water in the tank or tanks E will then begin to absorb the gas, and thus establish a current of gas throughout the entire length of the connected series of tubes. The sudden expansion of the gas absorbs the heat, and a refrigeratory action is maintained in and around the tubes, so that the temperature of the air in the vessel A is reduced to near the freezing-point.

If desired, a current of air could be forced against or in contact with the coil of pipes and thence into the vessel, or the tubes or pipes could be covered with some non-congealable liquid; but I shall usually surround it or them with a layer of some deliquescent salt, as explained in a former application for a patent made by me.

When the liquid in the vessel C is exhausted I detach it from the tubes or pipes and attach another charged vessel. Each car or other moving structure can thus carry a sufficient number of charged vessels to last while it is moving, and as often as one becomes exhausted it can be removed and a fresh one substituted in its place until the journey has been completed.

When desired, the water-tanks E can also be detached and other tanks of fresh water substituted in their places. These water-tanks, which contain the aqueous solution of ammonia, I carry along until the car or structure arrives at its destination, when the ammonia can be separated from the water by heat in the ordinary way and the empty vessels C again charged for future use.

I prefer in constructing the car or structure

A to make a separate narrow compartment, H, at one end, in which the water-tanks E are placed, so that they can be removed without entering the main rooms of the structure.

By this arrangement I am able to produce a refrigeratory action in a moving structure with but little expense.

Having thus described my invention, what I claim, and desire to secure by Letters Patent, is—

1. The improvement in maintaining a refrigeratory action in moving structures, consisting in storing anhydrous ammonia in closed vessels, in a liquid form, and connecting said vessels with a pipe or connected series of tubes inside of said structure, substantially as above set forth.

2. In a portable refrigerator, the combination of the detachable closed vessel C, in which is stored anhydrous ammonia in a liquid form, with the detachable water-tanks E and pipes B and D, substantially as and for the purpose set forth.

3. The connected series of tubes B B B, having the detachable closed vessel C, in which is stored anhydrous ammonia in a liquid form, attached to one end, in combination with one or more detachable water-tanks, E, connected with its opposite end, substantially as and for the purpose described.

4. In combination with an expansion-pipe, a portable vessel adapted to contain a compressed or liquefied gas, and to be placed in communication with or detached from the expansion-coil, substantially as and for the purpose set forth.

In testimony whereof I affix my signature in presence of two witnesses.

ROBERT H. LUCAS.

Witnesses:

GEO. H. STRONG,

S. H. NOURSE.